(12) United States Patent
Chen et al.

(10) Patent No.: US 9,371,637 B1
(45) Date of Patent: Jun. 21, 2016

(54) POWERED DRAIN UNCLOGGING ATTACHMENT DEVICE

(71) Applicants: Robert C V Chen, Cupertino, CA (US);
Tiffany Y W Chen, Cupertino, CA (US)

(72) Inventors: Robert C V Chen, Cupertino, CA (US);
Tiffany Y W Chen, Cupertino, CA (US)

( * ) Notice: Subject to any disclaimer, the term of this patent is extended or adjusted under 35 U.S.C. 154(b) by 0 days.

(21) Appl. No.: 14/674,643

(22) Filed: Mar. 31, 2015

Related U.S. Application Data

(60) Provisional application No. 62/099,994, filed on Jan. 5, 2015.

(51) Int. Cl.
| | |
|---|---|
| *E03C 1/302* | (2006.01) |
| *E03F 9/00* | (2006.01) |
| *B08B 9/045* | (2006.01) |
| *B08B 9/043* | (2006.01) |

(52) U.S. Cl.
CPC .............. *E03C 1/302* (2013.01); *B08B 9/045* (2013.01); *B08B 9/0436* (2013.01); *E03F 9/005* (2013.01)

(58) Field of Classification Search
CPC ............ E03F 9/002; E03F 9/005; E03C 1/30;
E03C 1/302; B08B 9/00; B08B 9/02; B08B 9/027; B08B 9/04; B08B 9/043; B08B 9/0436; B08B 9/045; B08B 9/047
USPC ............. 15/104.05, 104.09, 104.095, 104.16, 15/104.2, 104.31–104.33; 4/255.01
See application file for complete search history.

(56) References Cited

U.S. PATENT DOCUMENTS

| | | | | |
|---|---|---|---|---|
| 2,693,611 A | * | 11/1954 | Lombardi | A46B 5/06 15/104.09 |
| 3,574,878 A | * | 4/1971 | Shames | F16K 31/465 15/104.095 |
| 4,850,071 A | * | 7/1989 | Lawrence | A46B 5/00 15/104.095 |
| 5,769,960 A | * | 6/1998 | Nirmel | E03C 1/302 134/22.11 |
| 5,809,601 A | * | 9/1998 | Rivera | A46B 13/02 15/104.05 |
| 5,836,032 A | * | 11/1998 | Hondo | E03C 1/30 15/104.001 |
| 7,922,040 B2 | * | 4/2011 | Pierson | B08B 9/00 222/148 |
| 2008/0313831 A1 | * | 12/2008 | Kovach | B08B 9/0436 15/25 |
| 2013/0000680 A1 | * | 1/2013 | Azelton | B08B 9/0436 134/22.11 |
| 2015/0176263 A1 | * | 6/2015 | Lei | E03C 1/302 4/255.01 |

FOREIGN PATENT DOCUMENTS

| | | | |
|---|---|---|---|
| EP | 2363213 | * | 9/2011 |
| NL | 1004017 | * | 3/1998 |

* cited by examiner

*Primary Examiner* — Mark Spisich
(74) *Attorney, Agent, or Firm* — Lyman Moulton, Esq.; Moulton, Patents, PLLC

(57) ABSTRACT

A disclosed powered drain unclogging device, system and method comprises a rotational power source and an attachment having a first end detachably coupled to the rotational power source and a second end comprising a plurality of protrusions disposed laterally from a tip thereof in a spiral tip pattern and a helical body pattern configured to drive the rotating tip into a drain and grab and retain debris therefrom. The disclosed method comprises driving the rotating tip into a drain based on an interaction of the spiral arrangement of the protrusions proximal the tip with an inside of the drain walls. The method further includes unclogging debris from the drain via a grabbing and retaining action of the debris by the sharp barbs of the attachment and the driving action thereof. The protrusions comprise bristles and barbs which sway and adjust to varying drain diameters. A splash guard protects the user.

12 Claims, 5 Drawing Sheets

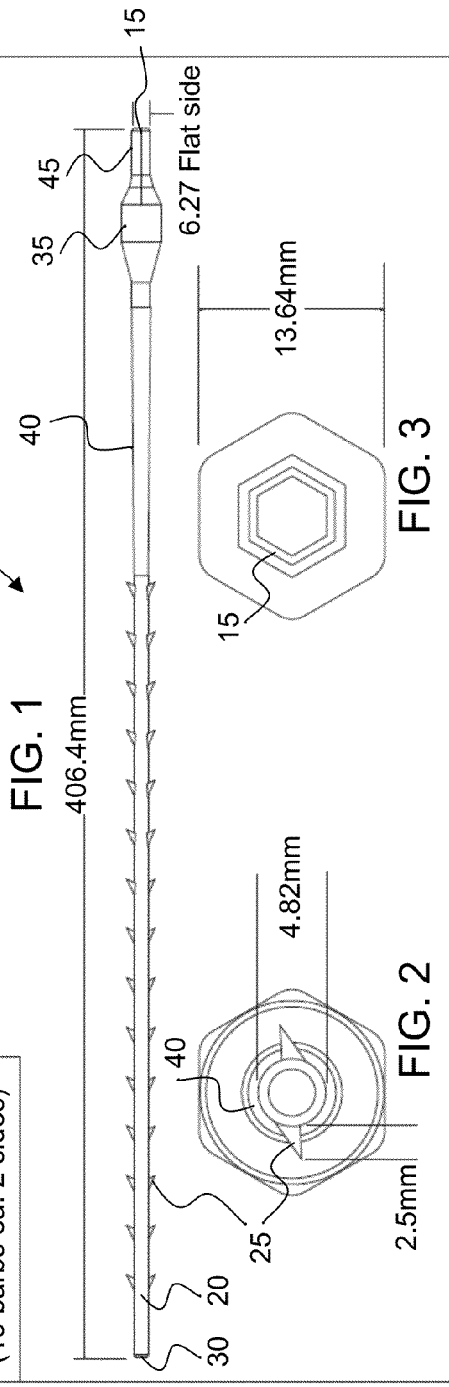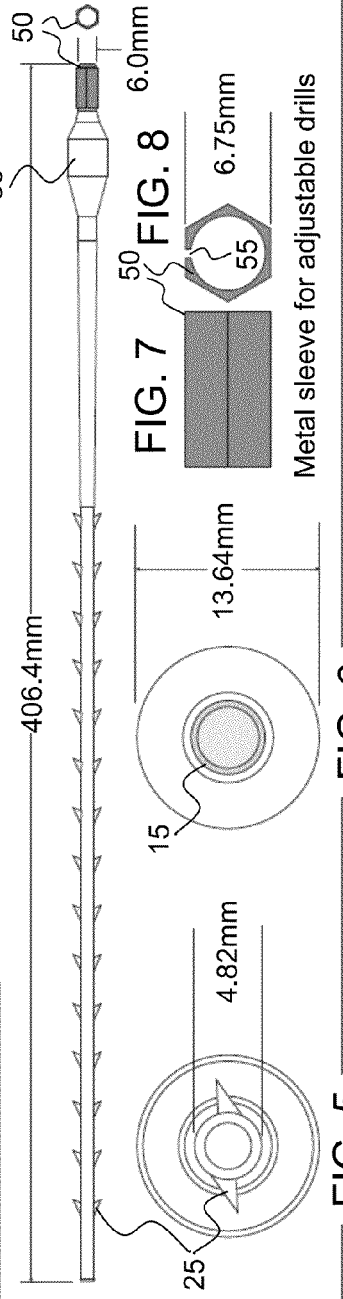

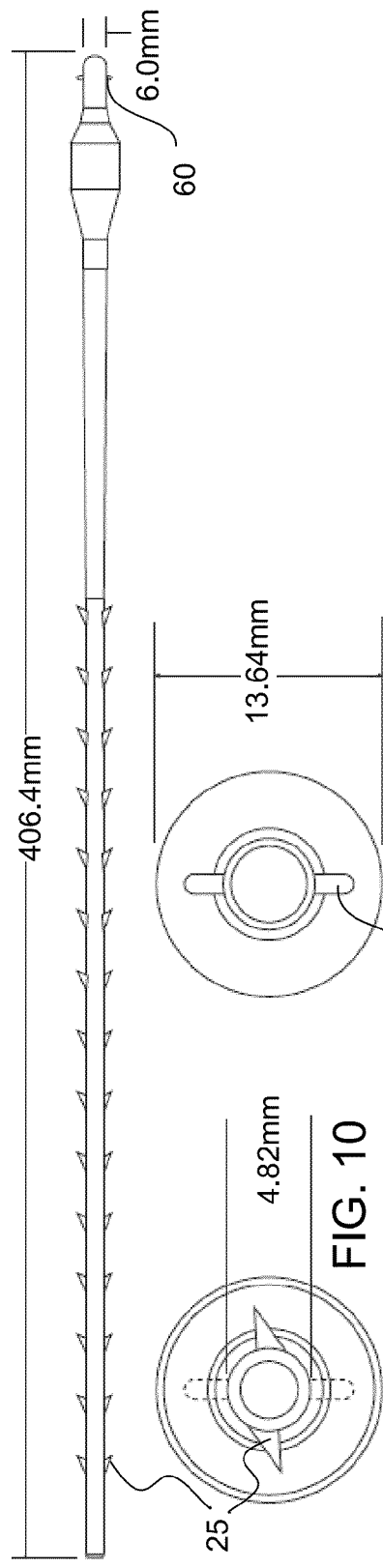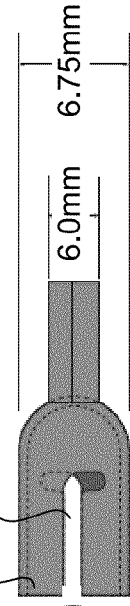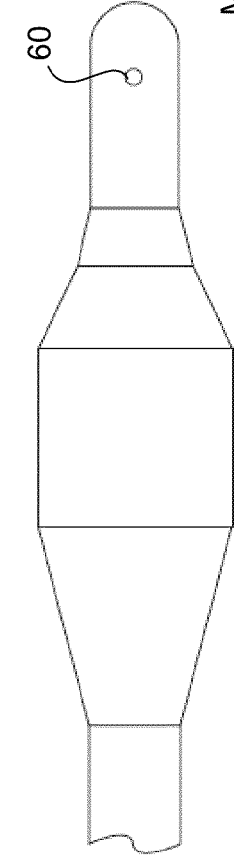

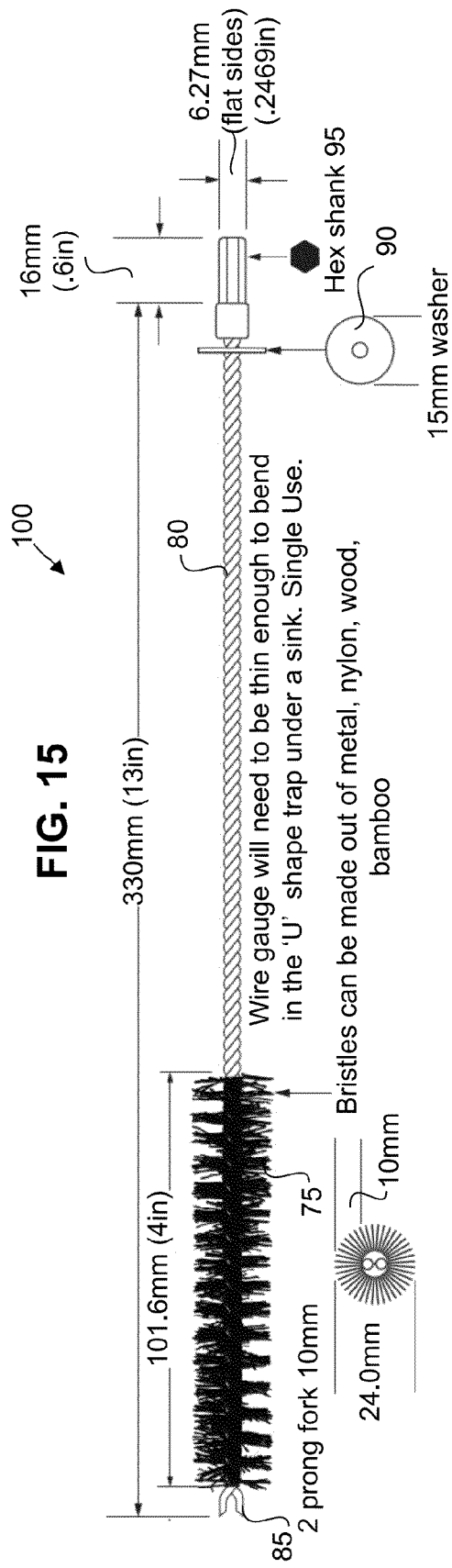
FIG. 15
FIG. 16
FIG. 17

POWERED DRAIN UNCLOGGING ATTACHMENT DEVICE

CROSS-REFERENCE TO RELATED APPLICATION

This application claims the benefit of the priority date of earlier filed U.S. Provisional Patent Application Ser. No. 62/099,994, titled 'Unclogger and Plant Nanny' filed Jan. 5, 2015 by Robert C V Chen and Tiffany Y W Chen U.S. incorporated herein by reference in its entirety.

BACKGROUND OF THE INVENTION

According to one source funded by a major brand household disinfectant, after visiting 35 United States homes and swabbing for bacteria in 32 locations in each home, an average number of bacteria per square inch was recorded for the following sites throughout a typical home. Toilet bowl: 3.2 million bacteria/square inch, Kitchen drain: 567,845 bacteria/square inch, Sponge or counter-wiping cloth: 134,630 bacteria/square inch, Bathtub drain: 119,468 bacteria/square inch, Kitchen sink, near drain: 17,964 bacteria/square inch, Kitchen faucet handle: 13,227 bacteria/square inch, Bathroom faucet handle: 6,267 bacteria/square inch, Bathroom sink—drain: 2,733 bacteria/square inch, Pet food dish, inside rim: 2,110 bacteria/square inch, Kitchen floor, in front of sink: 830 bacteria/square inch and Toilet floor, in front of toilet: 764 bacteria/square inch.

Therefore, with the exception of a toilet bowl, drains are the source of more bacteria per square inch than any other source in the home. These bacteria are best left undisturbed and out of contact with house inhabitants but drain clogs may not always be serviced with strong and caustic chemicals. In the alternative, non-chemical and mechanical methods for removing clogging drain debris run the risk of exposing a plumber and others to harmful bacterial.

There has therefore been a long unsatisfied demand in the market for a device, system and method for the sanitary unclogging of a domestic drain without the use of caustic chemicals. There is pent up demand for a device, system and method to remove clogging debris and not expose those in the home to the harmful and easily communicable bacteria therein.

SUMMARY OF THE INVENTION

A disclosed powered drain unclogging device comprises an attachment for a rotational power source comprising a first end detachably coupled to the rotational power source and a second end comprising a plurality of protrusions disposed laterally from a tip thereof in a spiral tip pattern and a helical body pattern arrangement configured to drive the rotating tip into a drain and grab and retain debris therefrom.

A disclosed powered drain unclogging system comprises a rotational power source having a variable rotational speed, torque and direction. The system also includes an attachment for the rotational power source comprising a first end detachably coupled to the rotational power source and a second end comprising a plurality of protrusions disposed laterally from a tip thereof in a spiral tip pattern and a helical body arrangement configured to drive the rotating tip into a drain and grab and retain debris therefrom.

A disclosed powered drain unclogging method comprises activating a rotational power source having a variable rotational speed, torque and direction. The method also includes providing an attachment for the rotational power source comprising a first end detachably coupled to the rotational power source and a second end comprising a plurality of protrusions disposed laterally from a tip thereof in a spiral arrangement. The method additionally includes driving the rotating tip into a drain based on an interaction of the spiral arrangement of the protrusions of the tip and the helical arrangement of the sharp barbs of the body with an inside of the drain walls. The method further includes unclogging debris from the drain via a grabbing and retaining action of the debris by the protrusions of the attachment and the driving action thereof.

Other aspects and advantages of embodiments of the disclosure will become apparent from the following detailed description, taken in conjunction with the accompanying drawings, illustrated by way of example of the principles of the disclosure.

BRIEF DESCRIPTION OF THE DRAWINGS

FIG. 1 is a side elevational view of a barbed attachment device comprising a boss and a hexagonal shank for a powered drain unclogging system in accordance with an embodiment of the present disclosure.

FIG. 2 is a tapered second end elevational view of an attachment device for a powered drain unclogging system in accordance with an embodiment of the present disclosure.

FIG. 3 is a hexagonal shank first end elevational view of an attachment device for a powered drain unclogging system in accordance with an embodiment of the present disclosure.

FIG. 4 is a side elevational view of sleeved shank attachment device for a powered drain unclogging system in accordance with an embodiment of the present disclosure.

FIG. 5 is a tapered second end elevational view of a sleeved shank attachment device for a powered drain unclogging system in accordance with an embodiment of the present disclosure.

FIG. 6 is a cylindrical shank first end elevational view of an attachment device for a powered drain unclogging system in accordance with an embodiment of the present disclosure.

FIG. 7 is a side elevational view of a shank sleeve of an attachment device for a powered drain unclogging system in accordance with an embodiment of the present disclosure.

FIG. 8 is an end elevational view of a shank sleeve of an attachment device for a powered drain unclogging system in accordance with an embodiment of the present disclosure.

FIG. 9 is a side elevational view of a post shank of a powered drain unclogging system in accordance with an embodiment of the present disclosure.

FIG. 10 is a tapered second end elevational view of a post shank of a powered drain unclogging system in accordance with an embodiment of the present disclosure.

FIG. 11 is a is a cylindrical post shank first end elevational view of an attachment device for a powered drain unclogging system in accordance with an embodiment of the present disclosure.

FIG. 12 is a close up view of a post shank and a boss of an attachment device for a powered drain unclogging system in accordance with an embodiment of the present disclosure.

FIG. 13 is a side elevational view of a mandrel configured for a post powered drain unclogging device in accordance with an embodiment of the present disclosure.

FIG. 15 is an elevational view of view of a twisted wire bristled attachment device for a powered drain unclogging system in accordance with an embodiment of the present disclosure.

FIG. 16 is an end elevational view of a bristled tip and two prong fork of the powered drain unclogging device in accordance with an embodiment of the present disclosure.

FIG. 17 is an end elevational view of a splash guard and hexagonal shank for the powered drain unclogging device in accordance with an embodiment of the present disclosure.

Figure 14:
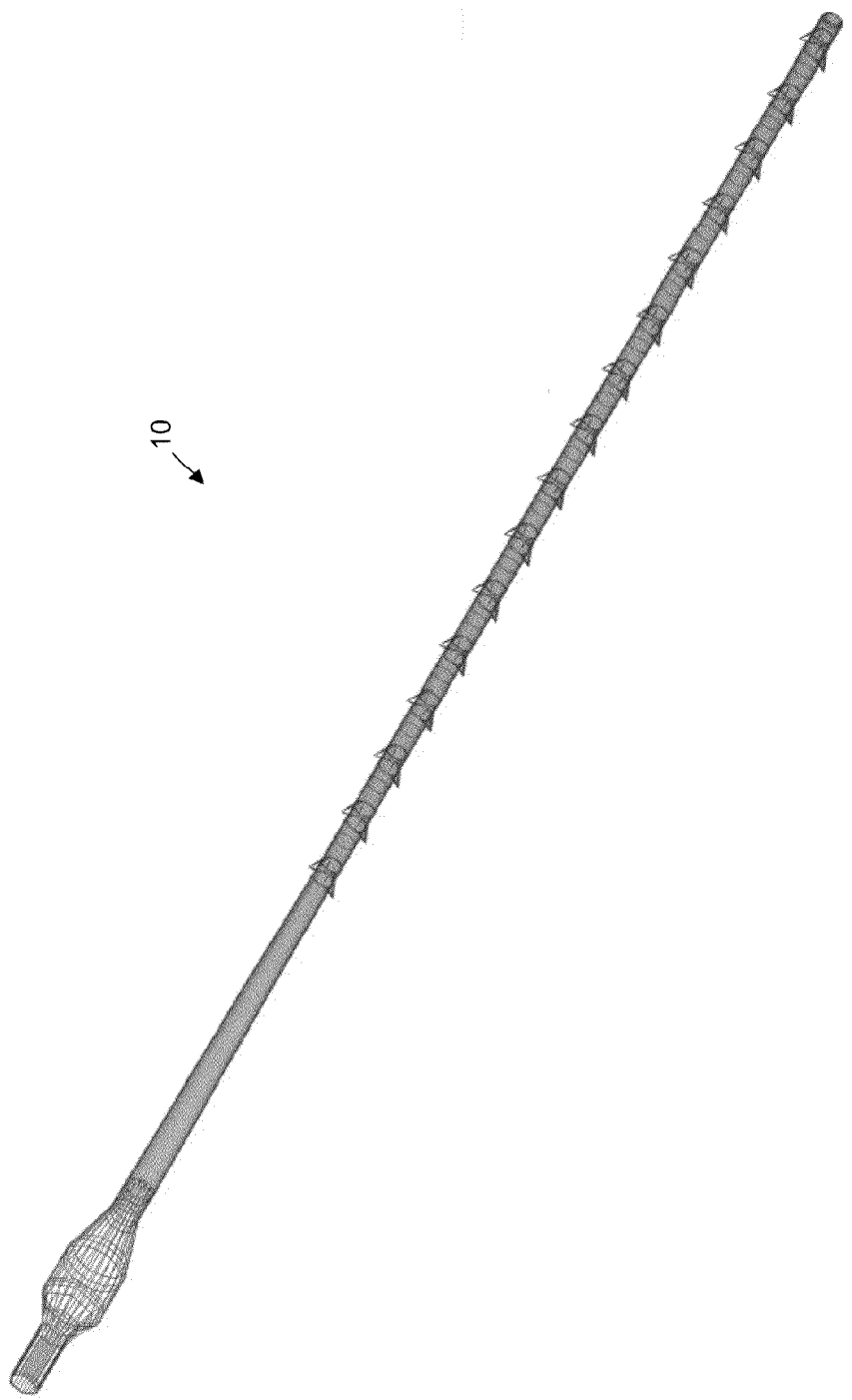
FIG. 14 is a perspective view of a barbed attachment device comprising a boss and a hexagonal shank for a powered drain unclogging system in accordance with an embodiment of the present disclosure.

Throughout the description, same reference numbers may be used to identify same or similar elements depicted in multiple embodiments. Although specific embodiments of the invention have been described and illustrated, the invention is not to be limited to the specific forms or arrangements of parts so described and illustrated. The scope of the invention is to be defined by the claims appended hereto and their equivalents.

DETAILED DESCRIPTION

Reference will now be made to exemplary embodiments illustrated in the drawings and specific language will be used herein to describe the same. It will nevertheless be understood that no limitation of the scope of the disclosure is thereby intended. Alterations and further modifications of the inventive features illustrated herein and additional applications of the principles of the inventions as illustrated herein, which would occur to one skilled in the relevant art and having possession of this disclosure, are to be considered within the scope of the invention.

Throughout the present disclosure, the term 'unclogging' may refer to removing hair, soap scum and other clogging debris from a household drain. The term 'unclogger' may refer to a device for unclogging such aforementioned drains. Also, the term 'barb' refers to a sharp projection angled away from a main point so as to make extraction difficult. Furthermore, the term 'boss' refers to a thicker part of the body shaft at a point where another part is attached to it, ie the body shank for insertion into a rotational power source. Additionally, the word 'helical' refers to the common meaning of the term including a curve in three dimensional space having a tangent line at any point which makes a constant angle with a fixed line called the axis. The word 'protrusion' refers to the common meaning of the term including bristles, barbs, fingers, knobs, strands, etc. The word 'fork' refers to a device having two or more prongs throughout the present application.

Dimensions detailed herein and in the drawings are intended to be a guide to nominal manufacturing dimensions. The detailed dimensions may vary by plus or minus ten percent taking into account manufacturing restraints and materials for various embodiments as recited, taught and suggested herein. The dimensions therefore are applicable to at least one embodiment but are not meant to be limiting to other embodiments of the disclosure.

FIG. 1 is a side elevational view of a barbed attachment device comprising a boss and a hexagonal shank for a powered drain unclogging system in accordance with an embodiment of the present disclosure. The device 10 includes a first end 15, a second end 20, protrusions 25, a tip 30, a shank boss 35, a cylindrical body 40 and a hexagonal shank 45. The backward facing sharp barbs 25 are configured to cut through sink debris and retain the debris such as hair during the removal of the attachment device 10 from the sink drain. The cylindrical body 40 of the attachment device 10 may measure a nominal 406.4 mm in length. A flat side of the hexagonal shank 45 may measure 6.27 mm. Any number of barbs 25 may protrude from a body 40 of the attachment device 10 including 15 pairs of barbed protrusions.

FIG. 2 is a tapered second end elevational view of an attachment device for a powered drain unclogging system in accordance with an embodiment of the present disclosure. The sharp geometry of the barbs 25 is clearly depicted in this drawing. A radial edge and an acute edge are joined at the sharp tip and the radial edges face an extended diametrical line or plane thereof. A radius of the cylindrical body 40 may measure 4.82 mm. An extension of a barb 25 from a body 40 of the attachment may measure 2.5 mm. In at least one embodiment of the disclosure, the barbed body is tapered from the boss 35 to the second end 20 thereof. The tapered body is configured to facilitate using the disclosed device in a variety of drain diameters.

FIG. 3 is a hexagonal shank first end elevational view of an attachment device for a powered drain unclogging system in accordance with an embodiment of the present disclosure. The shank 45 at the first end 15 of the attachment device 10 comprises a hexagonal geometry to facilitate gripping by a bit chuck or vise teeth to provide a rigid coupling to the rotational power source for a one to one ratio of the rotational power source movement and a rotational movement of the attachment device. A width of the hexagonal boss 35 may measure a nominal 13.64 mm.

FIG. 4 is a side elevational view of sleeved shank attachment device for a powered drain unclogging system in accordance with an embodiment of the present disclosure. This depiction includes same and similar limitations to those of FIG. 1 through FIG. 3 with the exception of the sleeve 50 depicted at the first end of the attachment device. The sleeve 50 is a hexagonal coupler to provide a detachable coupling between the rotational power source and a cylindrical shank. The sleeve is 50 configured to rigidly couple to the shank and provide a one to one ratio of the rotational power source movement and a rotational movement of the attachment device. The cylindrical body of the attachment device may measure a nominal 406.4 mm in length. A flat side of the hexagonal sleeve 50 may measure 6.00 mm.

FIG. 5 is a tapered second end elevational view of an attachment device for a powered drain unclogging system in accordance with an embodiment of the present disclosure. This depiction includes same and similar limitations and reference numbers to those of FIG. 1 through FIG. 3. The cylindrical body of the attachment device is clearly depicted in this drawing but other body configurations may comprise embodiments of the disclosure. Square, oval and random shaped body cross sections may comprise embodiments of the disclosure where manufacturing considerations, designs and economical considerations are considered. The tapered end facilitates inserting the attachment device into a drain either during powered operations or during manual operations. A radius of the cylindrical body may measure 4.82 mm.

FIG. 6 is a cylindrical shank first end elevational view of an attachment device for a powered drain unclogging system in accordance with an embodiment of the present disclosure. This depiction includes same and similar limitations and reference numbers to those of FIG. 1 through FIG. 3. A diameter of the body boss may measure a nominal 13.64 mm. A cylindrical body and a cylindrical boss may comprise the most durable attachment device and at the same time optimize manufacturing time, manufacturing costs and available materials. An embodiment of the disclosure may also include a hexagonal body and a cylindrical boss and shank.

FIG. 7 is a side elevational view of a shank sleeve of an attachment device for a powered drain unclogging system of in accordance with an embodiment of the present disclosure. This depiction includes same and similar limitations and reference numbers to those of FIG. 1 through FIG. 3. A side to side measurement of the shank sleeve 50 may comprise a nominal 6.75 mm. An inside surface of the shank sleeve 50 may be cylindrical to couple to a cylindrical body. Adhesive applied between the shank outer surface and the shank sleeve inner surface may provide a one to one ratio of the rotational power source movement and a rotational movement of the attachment device. However, a crimping pressure of the shank sleeve 50 around the body shank may also provide the direct coupling ratio desired for powered operation of the disclosed attachment device.

FIG. 8 is an end elevational view of a shank sleeve of an attachment device for a powered drain unclogging system in accordance with an embodiment of the present disclosure. A gap 55 is defined in one of the hexagonal sides to provide room for crimping the shank sleeve 50 onto the shank. This depiction includes same and similar limitations to those of other drawings and therefore may use same reference numbers used in other drawings. However, the disclosure comprises embodiments with a continuous sleeve and no gap.

FIG. 9 is a side elevational view of a post shank of a powered drain unclogging system in accordance with an embodiment of the present disclosure. This depiction includes same and similar limitations and reference numbers to those of FIG. 1 through FIG. 3. The shank may measure a nominal 6.0 mm in diameter. The one or more posts 60 may extend a nominal 2.5 mm from the shank. The depicted device may be designed and manufactured as a "use once" and to be disposed after using or it may be cleaned and used multiple times.

FIG. 10 is a tapered second end elevational view of a post shank of a powered drain unclogging system in accordance with an embodiment of the present disclosure. This depiction includes same and similar limitations and reference numbers to those of FIG. 1 through FIG. 3. A diameter of a body comprising the barbs may measure a nominal 4.82 mm in diameter. Two posts 60 are depicted in broken lines diametrically opposing each other but may be arranged in other configurations around the shank.

FIG. 11 is a is a cylindrical post shank first end elevational view of an attachment device for a powered drain unclogging system in accordance with an embodiment of the present disclosure. This depiction includes same and similar limitations and reference numbers to those of FIG. 1 through FIG. 3. A diameter of the boss may measure a nominal 13.64 mm. The shank is depicted in radial relation to the boss.

FIG. 12 is a close up view of a post shank and a boss of an attachment device for a powered drain unclogging system in accordance with an embodiment of the present disclosure. One tapered side left of the boss depicted may provide a stop for the attachment extension into a drain. Another tapered side right of the boss may provide a stop for the attachment into the mandrel or into a drill chuck. An embodiment of the sink unclogger tool and system comes in two parts. Part 1 goes into the power drill as a mandrel 65 depicted in FIG. 13 and is re-usable. This part may be used over and over again. Part 2 goes into the mandrel and was designed and manufactured as a disposable product, partly for hygienic reasons and in part for marketing reasons.

FIG. 13 is a side elevataional view of a mandrel configured for a powered drain unclogging device in accordance with an embodiment of the present disclosure. A slot 70 in the mandrel 65 is defined to receive a post 60 on the shank of the device 10. The mandrel 65 is an attachment tool that goes directly into a power screwdriver or power drill chuck. The mandrel 65 is configured to hold a work piece or a barbed unclogging device 10. The two pieces may be coupled together via a post 60 and slot 70 configuration. A post 60 formed on the unclogging device is complementary to a slot 70 formed on the mandrel 65. The slot 70 is formed to couple and lock the uncogging device 10 to the mandrel 65 when either component is twisted onto the other part. An end configured to be gripped by the teeth of a drill chuck may measure 6.27 mm from side to side. An outside diameter of the mandrel may measure a nominal 6.75 mm in diameter, an inside diameter configured to fit around the 6 mm shank.

FIG. 14 is a perspective view of a barbed attachment device comprising a boss and a hexagonal shank for a powered drain unclogging system in accordance with an embodiment of the present disclosure. This depiction includes same and similar limitations and reference numbers to those of FIG. 1 through FIG. 3. The attachment device comprises a hexagonal first end, a hexagonal boss, a cylindrical body and multiple backward facing sharp barbs protruding therefrom. A cross section of the barbed body may include one, two, three and any number of barbs arranged radially or peripherally there around. The hexagonal first end may comprise various multisided cross sectional geometries suitable for insertion into a rotational power source bit chuck or vise teeth. The hexagonal boss serves multiple purposes including a stop for insertion into the aforementioned bit chuck, reinforced body at the highest torsional and tangential forces stress point and an optional larger shank for insertion into larger bit chuck vise teeth.

FIG. 15 is an elevational view of view of a twisted wire bristled attachment device for a powered drain unclogging system in accordance with an embodiment of the present disclosure. The device 100 comprises bristles 75 may be disposed near the second end 20 between a twisted pair of flexible wire 80 which may also be brass for extended use or even low durometer plastic for disposable use. The bristles may extend a nominal 10 mm from the twisted wire pair 80 up to a nominal 3.0 cm width of a conventional sink drain and comprise brass, plastic, wood and any other bristle like material. A fork 85 results at the end of the twisted wire pair and may be sharpened and otherwise adapted to cut through hair and sink drain debris to facilitate unclogging.

FIG. 16 is an end elevational view of a bristled tip and two prong fork of the powered drain unclogging device in accordance with an embodiment of the present disclosure. This depiction includes same and similar limitations and reference numbers to those of FIG. 1 through FIG. 3. The end view includes a 24 mm diameter including the bristles and the twisted wire pair 80 and the 10 mm extension of the bristles from the twisted wire pair 80.

FIG. 16 is an end elevational view of a bristled tip and two prong fork of the powered drain unclogging device in accordance with an embodiment of the present disclosure. This depiction includes same and similar limitations and reference numbers to those of FIG. 1 through FIG. 3. The end view includes a 24 mm diameter including the bristles 45 and the twisted wire pair 50 and the 10 mm extension of the bristles from the twisted wire pair 50.

FIG. 17 is an end elevational view of a splash guard and hexagonal shank for the powered drain unclogging device in accordance with an embodiment of the present disclosure. The splash guard 90 is depicted as a washer disposed on the twisted wire pair body 80 near the hexagonal shank 95 prior to crimping the shank 95 onto the body 80. The diameter of the splash guard washer 90 may exceed the 24 mm diameter of the bristles and body up to a 3.0 cm diameter of a conventional sink drain.

Figure 18:
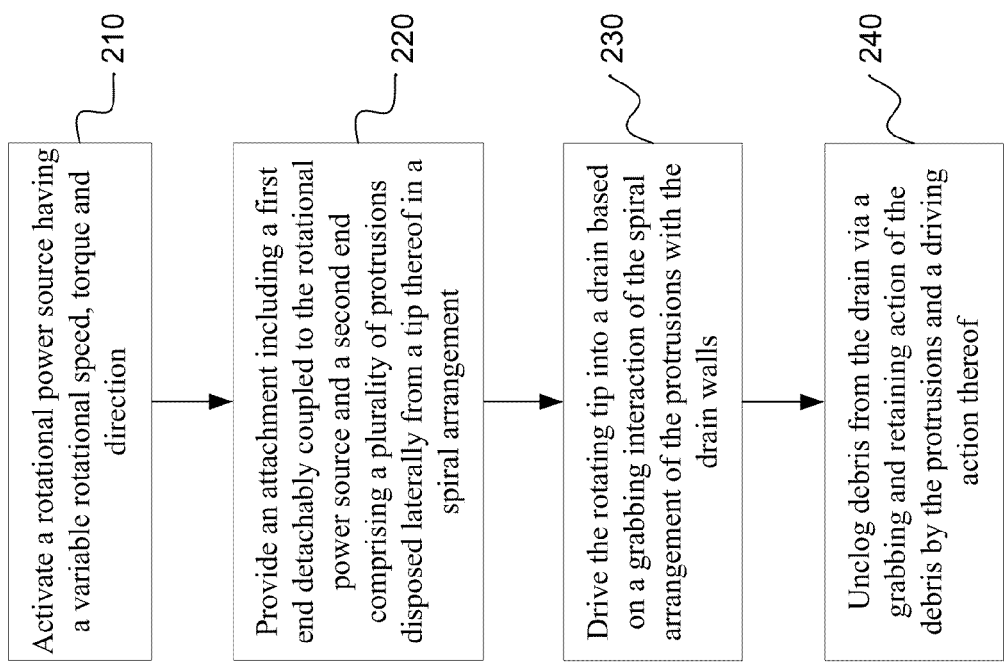
FIG. 18 is a flow chart of a method for cleaning a clogged drain with a powered drain unclogging device and system in accordance with an embodiment of the present disclosure.

FIG. 18 is a flow chart of a method for powered drain unclogging with the unclogging attachment device and system in accordance with an embodiment of the present disclosure. The method includes, 210 activating a rotational power source having a variable rotational speed, torque and direction. The method also includes 220 providing an attachment for the rotational power source comprising a first end detachably coupled to the rotational power source and a second end comprising a plurality of sharp barbs protruding laterally from a tip thereof in a spiral arrangement. The method additionally includes 230 driving the rotating tip into a drain based on a grabbing interaction of the spiral arrangement of the sharp barbs with the drain walls. The disclosed method further includes 240 unclogging debris from the drain via a grabbing and retaining action of the debris by the sharp barbs of the attachment and the driving action thereof.

Embodiments of the disclosed method include removing the rotating tip from the drain based on a reverse action of the rotational power source configured to drive the tip up and out of the drain. Embodiments also include detaching the attachment from the rotational power source and disposing the attachment including the clogging debris. The splash guard collar may be thrown away with the attachment or it may be recycled by removal from the attachment and storage in a bag.

Another embodiment of the powered drain unclogging device, system and method are disclosed. The system includes a rotational power source having a variable rotational speed, torque and direction. The system also includes an attachment for the rotational power source comprising a first end detachably coupled to the rotational power source and a second end comprising a plurality of protrusions disposed laterally from a tip thereof in a spiral tip arrangement and a helical body arrangement configured to drive the rotating tip into a drain and grab and retain a debris therefrom.

The powered drain unclogging device of the present disclosure includes a rotational power source configured to rotate in one direction through three hundred and sixty degrees. Another rotational power source of an embodiment is configured to rotate from zero to three hundred and sixty degrees and then reverse rotation from three hundred and sixty degrees back to zero. The rotational power source may be a battery powered and cordless drill or screwdriver.

A further embodiment of the powered drain unclogging device includes a length of the attachment configured to measure a nominal 16 inches from the first end to the second end thereof. The attachment also may comprise a flexible low durometer and disposable material including plastics, woods and metal materials. The attachment may also comprise one of a composite and any other rigid materials and composites thereof.

The plurality of protrusions disposed laterally from the tip of the attachment may be arranged there around in a spiral pattern for driving the tip into the sink and the helical arrangement of the barbs on the body for grabbing and retaining drain debris. In an embodiment, the plurality of sharp barbs protruding laterally from the tip of the attachment are arranged helically backward from the second end of the attachment at an angle of a nominal thirty degree pitch plus or minus ten percent from a radial line of reference.

The plurality of protruding disposed laterally from the tip of the attachment may additionally be arranged in a cluster within a nominal three inches from the second end of the attachment to allow surface area near the first end thereof for grasping the attachment for detaching and disposal after use. The plurality of sharp barbs comprise a low durometer material configured to sway and adjust therefore to a variety of drain diameters including a nominal nine-eighth's drain diameter plus or minus an eighth of an inch.

Furthermore, the attachment may include a splash guard collar attached proximal the first end of the attachment, the splash guard configured to have a diameter equal to or larger than a conventional sink drain including outside diameters of approximately one inch and one and one half inches. The splash guard protects a user from errant debris and fluids splashing back in the unclogging process. The splash guard collar may be transparent and it may be opaque depending on manufacturing costs, demands and designs.

The present disclosure therefore meets the long felt need in the market for unclogging household drains by providing a non-caustic and non-chemical and disposable and yet reusable means for unclogging household drains. The present disclosure also provides a powered means for unclogging household drains and thus provides a non-obvious and unanticipated means over the prior market choices available to the household consumer.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

While the forgoing examples are illustrative of the principles of the present disclosure in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the disclosure be limited, except as by the specification and claims set forth herein.

What is claimed is:

1. A powered drain unclogging device for a rotational power source, comprising:
   a twisted wire attachment for the rotational power source comprising a first end adapted to be detachably coupled to the rotational power source and a second end comprising a plurality of protrusions disposed laterally and proximal a tip thereof in a helical arrangement configured to drive the rotating tip into a drain and grab and retain debris therefrom; and
   a sharpened fork extending longitudinally from the twisted wire attachment at the second end, wherein the protrusions comprise a plurality of bristles disposed laterally from the twisted wire attachment and wherein the sharpened fork is adapted to cut through hair and sink drain debris to facilitate unclogging.

2. The powered drain unclogging device of claim 1, further comprising a flanging boss portion of the attachment proximal the first end, the flanging boss portion configured to provide rigidity to the attachment at a point of highest stress and provide a stop for the first end detachably coupled to the rotational power source.

3. The powered drain unclogging device of claim 1, wherein the twisted wire attachment comprises one of semi-rigid material including twisted brass wires and a flexible low durometer and disposable material including plastic and plastic composites.

4. The powered drain unclogging device of claim 1, wherein the plurality of bristles protruding laterally from the tip of the attachment are arranged around the attachment in a helical pattern, the arrangement configured to drive the tip into the drain.

5. The powered drain unclogging device of claim 1, further comprising a slideable splash guard attached proximal the first end of the attachment, the slideable splash guard configured to be equal to or larger than a diameter of a conventional sink drain including outside diameters of approximately one inch and one and one half inches.

6. The powered drain unclogging device of claim 1, wherein the plurality of protrusions are adapted to sway and adjust to a variety of drain diameters including a nominal nine-eighths drain diameter plus or minus an eighth of an inch.

7. A powered drain unclogging system, comprising:
   a rotational power source having a variable rotational speed, torque and direction;
   a twisted wire attachment for the rotational power source comprising a first end adapted to be detachably coupled to the rotational power source and a second end comprising a plurality of protrusions disposed laterally from a tip thereof in a helical arrangement configured to drive the rotating tip into a drain and grab and retain debris therefrom; and
   a sharpened fork extending longitudinally from the twisted wire attachment at the second end, wherein the protrusions comprise a plurality of bristles disposed laterally front the twisted wire attachment and wherein the sharpened fork is adapted to cut through hair and sink debris to facilitate unclogging.

8. The powered drain unclogging system of claim 7, wherein the power source comprises one of a battery powered drill and screwdriver and an Alternating Current drill and screwdriver.

9. A powered drain unclogging method, comprising:
   activating a rotational power source having a variable rotational speed, torque and direction;
   providing a twisted wire attachment for the rotational power source comprising a first end adapted to be detachably coupled to the rotational power source and a second end comprising a plurality of protrusions disposed laterally from a tip thereof in a helical arrangement;
   driving the rotating tip into a drain based on an interaction of the helical arrangement of the protrusions with an inside of the drain;
   unclogging debris from the drain via a grabbing and retaining action of the debris by the protrusions of the attachment and the driving action thereof; and
   cutting through hair and sick drain debris to facilitate unclogging via a sharpened fork extending longitudinally from the twisted wire attachment.

10. The powered drain unclogging method of claim 9, further including sliding a splash guard collar onto the first end of the attachment, the splash guard collar configured to protect a user from errant debris and fluids splashing from the sink drain.

11. The powered drain unclogging method of claim of claim 9, further comprising removing the rotating tip from the drain based on a reverse action of the rotational power source.

12. The powered drain unclogging method of claim 9, further comprising detaching the attachment from the rotational power source and disposing the attachment including the clogging debris.

\* \* \* \* \*